United States Patent [19]

Kapoor et al.

[11] Patent Number: 5,980,857
[45] Date of Patent: Nov. 9, 1999

[54] PRODUCTION OF CARBON MONOXIDE FROM SYNGAS

[75] Inventors: Akhilesh Kapoor, New Providence; Yudong Chen, Bridgewater, both of N.J.; Simon Paul Davies, Guildford, United Kingdom; Ravi Kumar, Allentown, Pa.; Robert Michael Thorogood, Shere, United Kingdom

[73] Assignee: The Boc Group, Inc., New Providence, N.J.

[21] Appl. No.: 09/040,575

[22] Filed: Mar. 18, 1998

[51] Int. Cl.⁶ .................................. C01B 3/12; C01B 3/16
[52] U.S. Cl. .......................... 423/648.1; 95/98; 95/103; 95/139; 95/140; 423/650; 423/651; 423/652; 423/655; 423/656
[58] Field of Search ................................ 95/98, 103, 139, 95/140; 423/648.1, 650, 651, 652, 655, 656

[56] References Cited

U.S. PATENT DOCUMENTS

| | | |
|---|---|---|
| 4,171,206 | 10/1979 | Sicar . |
| 4,778,670 | 10/1988 | Pinto ........................................ 423/652 |
| 5,073,356 | 12/1991 | Guro et al. . |
| 5,133,785 | 7/1992 | Kumar et al. . |
| 5,152,975 | 10/1992 | Fong et al. ............................... 423/656 |
| 5,152,976 | 10/1992 | Fong et al. ............................... 423/656 |
| 5,234,472 | 8/1993 | Krishnamurthy et al. ................ 95/140 |
| 5,300,271 | 4/1994 | Golden et al. ............................ 95/140 |
| 5,529,763 | 6/1996 | Peng et al. ................................ 95/140 |
| 5,538,706 | 7/1996 | Kapoor et al. ........................... 423/650 |
| 5,669,960 | 9/1997 | Couche .................................... 95/139 |
| 5,714,132 | 2/1998 | Kapoor et al. ........................... 423/650 |

*Primary Examiner*—Wayne Langel
*Attorney, Agent, or Firm*—Michael F. Esposito; Salvatore P. Pace

[57] ABSTRACT

A process for producing hydrogen gas by reacting steam with a gas mixture containing carbon monoxide, carbon dioxide and hydrogen to produce a hydrogen-enriched product gas and subjecting the product gas to pressure swing adsorption to produce a high purity hydrogen product and a hydrogen-depleted waste gas is improved by drying, where necessary, part of the gas mixture and subjecting the dry gas mixture to pressure swing adsorption using a carbon monoxide-selective adsorbent to produce a high purity carbon monoxide product gas and a carbon monoxide-depleted waste gas. Where the gas mixture is produced by endothermic reaction, one or both of the hydrogen-depleted waste gas and the carbon monoxide-depleted waste gas can be used as fuel to supply heat for the endothermic reaction.

25 Claims, 1 Drawing Sheet

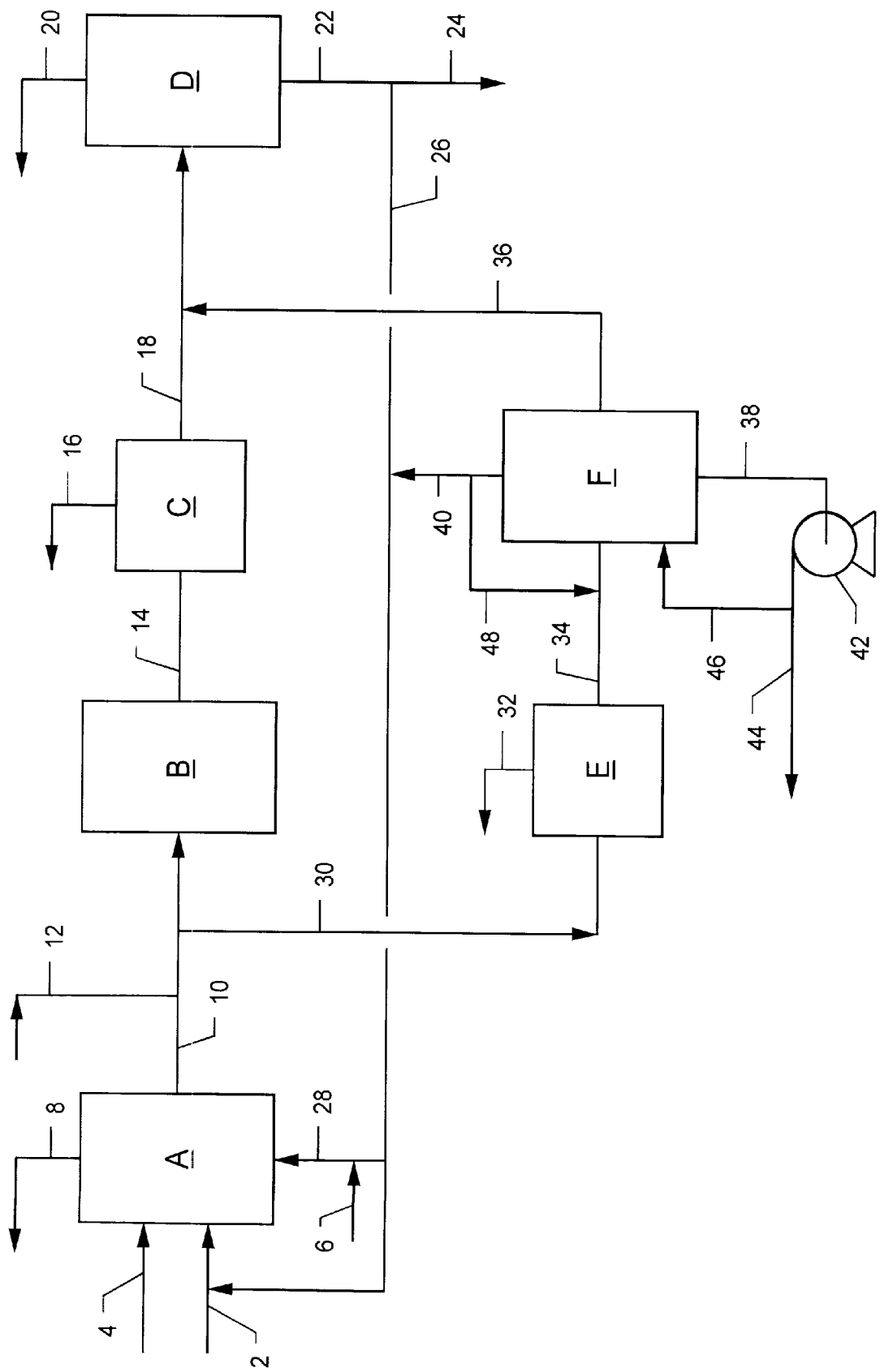

PRODUCTION OF CARBON MONOXIDE FROM SYNGAS

FIELD OF THE INVENTION

This invention relates to the production of carbon monoxide, and more particularly to the production of carbon monoxide from a gas stream comprising hydrogen, carbon monoxide and carbon dioxide. Specifically, it relates to a process for producing a high purity carbon monoxide product from a gas stream that is used to produce high purity hydrogen by the water-gas shift reaction.

BACKGROUND OF THE INVENTION

High purity hydrogen can be produced by the water-gas shift reaction of carbon monoxide in the presence of steam. The equation for this reaction is:

$$CO + H_2O \rightarrow H_2 + CO_2$$

High purity hydrogen is conventionally recovered from the product gas by hydrogen PSA using a carbon dioxide-selective adsorbent. Often, the carbon monoxide that is used as feed for the shift reaction is produced by reforming or partially oxidizing hydrocarbon-containing substances, such as natural gas. The product gas from these reactions contains hydrogen, carbon monoxide and carbon dioxide.

A major disadvantage of producing high purity hydrogen by the water-gas shift reaction using the above-mentioned feedstocks occurs in the hydrogen recovery stage, i.e. the hydrogen PSA step. The yield and purity of hydrogen recovered from gas mixtures by PSA is somewhat dependent upon the concentration of impurities in the feed gas to the PSA system. The efficiency of the hydrogen recovery drops as the concentration of impurities such as carbon monoxide and carbon dioxide in the PSA feed gas increases.

The above-described hydrogen PSA process can be improved by removing carbon dioxide from the feedstock to the water-gas shift reactor. This can be accomplished, for example, by means of membrane separation or PSA. However, removal of carbon dioxide from the feedstock to the water-gas shift reaction adds considerable cost to the high purity hydrogen production process, and may make the modified process economically unfeasible.

It is often desirable to produce high purity carbon monoxide for use in various chemical processes. The shift reaction feedstocks discussed above are excellent sources of carbon monoxide. However, the above-described process does not provide for the efficient production of high purity carbon monoxide.

It would be desirable to enhance the yield and purity of the hydrogen PSA process, and to provide for the coproduction of high purity carbon monoxide. This invention accomplishes these objectives.

SUMMARY OF THE INVENTION

In a broad embodiment, the invention comprises an improvement to a process for producing hydrogen by reacting a gas mixture comprising hydrogen, carbon monoxide, carbon dioxide and, optionally, methane with steam, thereby causing at least part of the carbon monoxide to react with the steam to produce a hydrogen-enriched intermediate stream, and subjecting the hydrogen-enriched intermediate stream to a hydrogen pressure swing adsorption process comprising an adsorption step and an adsorbent regeneration step using a carbon dioxide-selective adsorbent, thereby producing a high purity hydrogen product stream and a first waste gas enriched in carbon dioxide or carbon dioxide and methane, if the latter is present in the gas mixture. The improvement comprises:

(a) passing part of the gas mixture through at least one adsorption vessel at superatmospheric pressure, the at least one adsorption vessel containing an adsorbent which most strongly adsorbs carbon monoxide and least strongly adsorbs hydrogen from the dried gas mixture, thereby producing a nonadsorbed hydrogen-enriched gas and a carbon monoxide-enriched adsorbed phase;

(b) partially depressurizing the at least one adsorption vessel, thereby producing a second waste gas stream enriched in carbon dioxide or carbon dioxide and methane, when the latter is present in the gas mixture;

(c) further depressurizing the at least one adsorption vessel, thereby producing a carbon monoxide-enriched product gas; and (d) recycling the nonadsorbed hydrogen-enriched gas to the hydrogen-enriched intermediate stream.

When methane is present in the gas mixture, it is generally present at a concentration up to about 10% by volume. If the gas mixture initially contains moisture it is preferably dried prior to step (a).

The gas mixture may be produced in a heated reaction zone. The process may further comprise recycling at least part of the first waste gas, at least part of the second waste gas or at least part of both the first waste gas and the second waste gas to the reaction zone. In this case, the process may further comprise using at least part of the first waste gas, at least part of the second waste gas or at least part of both the first waste gas and the second waste gas as fuel to heat the reaction zone.

Generally, the hydrogen pressure swing adsorption step of the process is carried out at a temperature in the range of about 0 to about 100° C. The adsorption step of the hydrogen pressure swing adsorption process is usually carried out at a pressure in the range of about 1 to about 40 bara, and the adsorbent regeneration step of the hydrogen pressure swing adsorption process is carried out at a pressure in the range of about 0.5 to about 5 bara.

Generally, steps (a), (b) and (c) of the broad process are carried out at a temperature in the range of about 0 to about 200° C., and they are preferably carried out at a temperature in the range of about 60 to about 150° C. Also, step (a) of the above process is generally carried out at a pressure in the range of about 1 to about 40 bara, and step (c) is usually carried out at a pressure in the range of about 0.05 to about 5 bara.

The gas mixture can be conveniently produced by hydrocarbon reforming, hydrocarbon partial oxidation, hydrocarbon gasification, coal gasification, iron ore reduction or mixtures of these. In a preferred embodiment, the gas mixture is produced by hydrocarbon steam reforming, hydrocarbon carbon dioxide reforming or mixtures of these.

In another preferred embodiment, the adsorbent used in steps (a), (b) and (c) of the broad process contains $Cu^+$ ion, $Ag^+$ ion, $Pd^{++}$ ion or mixtures of these. In this case, step (b) is preferably carried out at a temperature in the range of about 60 to about 150° C. In another preferred embodiment, step (a) is carried out at a pressure in the range of about 1 to about 20 bara, and in another preferred embodiment, step (d) is at least partially carried out at a pressure in the range of about 0.05 to about 1.5 bara.

In a modification of the broad process, the process further comprises subjecting at least part of the gas mixture going to the at least one adsorption vessel to a pressure swing adsorption process using a carbon dioxide-selective adsorbent.

In another modification, the broad process may include the step of subjecting at least part of the second waste gas to a pressure swing adsorption process using a carbon dioxide-selective adsorbent, thereby producing a carbon dioxide-enriched gas and a carbon dioxide-depleted gas. In this case the carbon dioxide-depleted gas may be recycled to the reaction zone or, if the gas mixture is produced in a heated reaction zone, at least part of the carbon dioxide-depleted gas can be used as fuel to heat the reaction zone.

Another modification of the invention comprises, during or subsequent to step (c), cocurrently purging the adsorbent in the at least one adsorption vessel with carbon monoxide-enriched product gas produced during step (c) of the broad process. A further modification comprises recycling part of the second waste gas stream to the at least one adsorption vessel during step (a).

BRIEF DESCRIPTION OF THE DRAWING

The appended drawing FIGURE is a schematic representation of one embodiment of the invention. Valves, lines and equipment that are not necessary for an understanding of the invention have not been included in the drawing.

DETAILED DESCRIPTION OF THE INVENTION

The invention provides an efficient method of producing a high purity hydrogen product gas and a high purity carbon monoxide product gas from a gas mixture containing carbon monoxide, carbon dioxide and hydrogen. As used herein, the term "high purity hydrogen" means a gas stream containing at least 90% by volume and the term "high purity carbon monoxide" means a gas stream containing at least 90% by volume carbon monoxide. The term "enriched" when used, for example, to characterize a component of product gas exiting a process step, means that the concentration of the component in the product gas is higher than the concentration of the component in the feed to the process step, and the term "depleted" when used to characterize a component of product gas exiting a process step, means that the concentration of the component in the product gas is lower than the concentration of the component in the feed to the process step.

The invention can be more easily understood when considered with the appended drawing. The system illustrated in the drawing includes, as major equipment units, a hydrocarbon reactor, A, a water gas shift reactor, B, a first gas dryer, C, a hydrogen PSA system, a second gas dryer, E and a carbon monoxide PSA system, F.

Hydrocarbon reactor A can be any system in which a gas stream comprising carbon monoxide, carbon dioxide, and hydrogen is produced. For example, reactor A may be a steam reformer, a carbon dioxide reformer, a hydrocarbon partial oxidation reactor, a petroleum or coal gasifier, an iron ore reducing furnace, etc. For ease of discussion, reactor A will be described as a steam methane reformer. Reactor A is provided with natural gas feed inlet 2, steam supply line 4, fuel inlet line 6, furnace exhaust line 8 and reformed gas outlet line 10. Water quench line 12 joins line 10 downstream of reactor A. Alternatively, the stream in line 10 can be cooled in a waste heat boiler before being introduced into reactor B. Line 10 connects to the inlet of water-gas shift reactor B.

Reactor B contains a catalytic material which converts mixtures of carbon monoxide and steam to hydrogen and carbon dioxide at elevated temperatures. Suitable water gas shift catalysts include iron- or copper-based materials. Reactor B is provided with product gas line 14, which is connected to the inlet of gas dryer C.

Dryer C is typically any dryer which removes moisture from gas streams without removing significant amounts of other components of gas streams. Suitable gas dryers include PSA and TSA units containing a desiccant such as silica gel, activated alumina, 3A zeolite, etc. Dryer C is provided with moisture vent line 16 and dried product gas line 18. Line 18 is connected to the inlet of hydrogen PSA system D.

PSA system D is any typical PSA plant containing an adsorbent which effectively and efficiently separates hydrogen from carbon dioxide and other components of the gas stream passing through line 18. System D may comprise, for example, a single adsorption unit or battery of adsorption units operated in phase, or a plurality of adsorption units or batteries of adsorption units operated out of phase, whichever is desired. When a system comprising a single adsorption unit or an "in phase" battery of units is used, the adsorption step must be periodically stopped to permit regeneration of the adsorbent bed(s), whereas when a plurality of adsorption units are employed in parallel and operated out of phase, one or more units can be in adsorption service producing high purity hydrogen, while one or more other units are undergoing regeneration to release the adsorbed carbon dioxide and other adsorbed impurities. Operation of the adsorption beds of system D is cyclical. A partial cycle (half-cycle) occurs when one bed has undergone all of the steps in the adsorption process, and a full cycle occurs when each bed of the adsorption system has undergone a partial adsorption cycle. In the complete adsorption process full cycles are repeatedly carried out, so that the process is substantially continuous. In a preferred embodiment of the invention, system D is a multibed system with parallel vessels, each bed being packed with one or more carbon dioxide-selective adsorbents and operated out of phase. Suitable adsorbents for use in system D include calcium X zeolite, zeolite 5A, zeolite 13X, activated carbon, etc. PSA system D is provided with high purity hydrogen product line 20 and waste gas line 22. Line 22 is connected to waste gas discharge line 24 and to recycle line 26. Line 26, in turn, joins natural gas feed line 2, and is also connected to fuel line 6 through line 28.

Line 30 connects line 10, at a point downstream of the juncture of lines 10 and 12, to the inlet end of dryer E. Dryer E is substantially the same as Dryer C, and it is provided with a moisture vent line 32 and dried gas line 34. Line 34 is connected to the inlet end of carbon monoxide PSA system F.

System F is any typical PSA adsorption system of the types mentioned above. It is preferably a multibed vessel system which operates out of phase, as described above. The vessels of system F are packed with adsorbent which most strongly adsorbs carbon monoxide and least strongly adsorbs hydrogen. Components of the feed gas to system F which are less strongly adsorbed than carbon monoxide and more strongly adsorbed than hydrogen include carbon dioxide, and usually methane. Suitable adsorbents for use in system F are those mentioned above, i.e. copper$^+$ ion-, silver$^+$ ion- and palladium$^{++}$ ion-containing materials. Typical adsorbents include copper salt-containing adsorbents, such as copper chloride-impregnated alumina, copper$^+$ ion-exchanged type X zeolite, silver nitrate-impregnated alumina, silver$^+$ ion-exchanged type X zeolite, palladium dichloride-impregnated alumina, etc.

System F is provided with nonadsorbed product line 36, which is connected to line 18, carbon monoxide product line 38, and waste gas line 40, which is connected to waste gas line 26. Line 38 is connected to the inlet end of vacuum pump 42. Carbon monoxide product discharge line 44 is connected to the discharge end of pump 42. In the system illustrated in the drawing, optional purge gas line 46 connects the outlet end of vacuum pump 42 to the adsorption vessels of system F, to provide a cocurrent purge, if desired. Purge effluent recycle line 48 connects line 40 to line 34.

All of the above equipment units and systems are conventional and details concerning their design and construction do not constitute a critical part of the invention. Suitable adsorbents for use in the process of the invention are commercially available and their preparation forms no part of the invention.

High purity hydrogen is conventionally produced in the portion of the illustrated system comprising units A, B, C and D as follows: Reactor A is brought to the desired operating temperature by combusting fuel introduced into the furnace thereof through line 6. Furnace exhaust gas leaves the furnace of reactor A through line 8. When the temperature in the reaction chamber of reactor A reaches the desired reforming temperature, generally in the range of about 750 to about 950° C., a hydrocarbon feed, such as natural gas, is introduced into the system through line 2, together with steam, introduced via line 4. The natural gas is reformed at a pressure in the range of about 1 to about 50 bara (bar absolute) into a wet gaseous product stream comprising hydrogen, carbon monoxide, carbon dioxide, for example on a dry volume basis, about 70% hydrogen, 13% carbon monoxide, 9% carbon dioxide, 6% methane, about 1% nitrogen. The product gas exits reactor A at a temperature in the range of about 750 to about 950° C. and a pressure in the range of about 1 to about 50 bara, whereupon it is quenched with water, introduced into line 10 via line 12. The gas stream next enters water-gas shift reactor at a temperature in the range of about 125 to about 400° C. and a pressure in the range of about 1 to about 40 bara. Upon contact with the catalyst in reactor B, carbon monoxide in the reactor A product gas reacts with steam, thereby producing additional hydrogen and carbon dioxide according to the above-stated water-gas shift reaction.

If desired steam may be introduce directly into reactor B through a direct steam inlet line (not shown). The shift reactor product gas leaves reactor B through line 14, and it typically contains about 70% hydrogen, 20% carbon dioxide, 3% carbon monoxide, 6% methane and about 1% nitrogen. This gas stream is cooled to below about 40° C., dried in dryer C and introduced into hydrogen PSA system D. A high purity hydrogen stream 9 (containing at least about 90% hydrogen) exits system D through line 20, and a waste gas stream containing the balance of the gas stream entering system D exits this system through line 22. This waste gas may be discharged from the system through line 24, it may be recycled to natural gas feed line 2 or it may be introduced into the furnace portion of reactor A as supplemental fuel. As can be readily seen, the above process makes no provision for the production of high purity carbon monoxide. High purity carbon monoxide can also be produced from the steam reformer product gas by combining the basic system comprising units A, B, C and D, with additional units E and F, and operating adsorption system F in a manner such that a hydrogen-lean and carbon monoxide-lean first depressurization stream is produced in addition to a nonadsorbed hydrogen-enriched stream and a desorbed carbon monoxide-enriched product gas stream. This is accomplished by operating carbon monoxide PSA system F using an adsorption cycle which includes an adsorption step, a first depressurization step and a second depressurization (desorption) step. The first depressurization step may be cocurrent (in the direction from the feed inlet end of the adsorption vessels of system F to the nonadsorbed product outlet) or countercurrent (in the direction opposite to the cocurrent direction), but it is preferably cocurrent, since this permits a carbon monoxide product gas of higher purity to be obtained in the second depressurization step. Depending upon the number of adsorption vessels used in system F, the adsorption cycle practiced in the vessels of this system may include other steps, such as pressure equalization, and nonadsorbed product backfill in addition to feed pressurization.

According to the modified process, a portion of the reactor A product gas is diverted from line 10 to line 30, dried in dryer E and introduced into carbon monoxide PSA system F via line 34. The vessels of system F are pressurized with the feed gas to the desired adsorption pressure and the adsorption step initiated by opening a valve (not shown) in line 36, thus causing a nonadsorbed product gas that is enriched in hydrogen and depleted in carbon monoxide to pass through line 36. This nonadsorbed product gas raises the concentration of hydrogen in the feed gas to system D, which enhances the recovery of the hydrogen product gas leaving system D through line 20. As the adsorption step proceeds in the vessel(s) of system F in adsorption service, the adsorbed carbon monoxide front advances toward the nonadsorbed product outlet end of the vessel(s). When the front reaches a predetermined point in the adsorption vessels, the adsorption step is terminated and the first depressurization step begins.

During the first depressurization step, gas contained in the void spaces of the adsorbent in the vessels is discharged, preferably cocurrently, from the vessels. This gas, which is enriched in carbon dioxide and methane and is depleted in hydrogen and carbon monoxide, leaves system F through line 40 and enters line 26, from which it can be discharged from the system through line 24 or recycled to reactor A as feed or fuel. It may be desirable to purge the vessels undergoing depressurization. This can be accomplished during or subsequent to the first depressurization step. This increases the concentration of carbon monoxide in the adsorption vessels and causes components other than carbon monoxide to be desorbed from the adsorbent during the first depressurization step. This increases the purity of carbon monoxide product gas being discharged from the vessels during the second depressurization step. Purging of the adsorbent in the vessels of system F is accomplished by flowing high purity carbon monoxide product gas from line 46 cocurrently through the adsorption vessels. The high purity carbon monoxide purge gas can be obtained from one or more vessels of system F that are undergoing the second depressurization step, or from a storage vessel located downstream of pump 42.

In a modification of the improved process, part of the purge effluent leaving system F through line 40 is recycled via line 48 to system F as feed. This has the effect of increasing the amount of carbon monoxide recovered from the system.

Upon completion of the first depressurization step, or the purge step, which occurs before the concentration of carbon monoxide leaving the adsorption vessels during the first depressurization step reaches an unacceptable level, the second depressurization step is begun.

During the second depressurization step, high purity carbon monoxide product gas is withdrawn countercurrently from the vessel(s) of system F. This is accomplished by activating vacuum pump 42 and evacuating the appropriate adsorption vessel(s) to the desired extent. The high purity carbon monoxide product gas is discharged to storage or a downstream application via line 44.

It can be appreciated that the improved process of the invention provides a two-fold benefit. Firstly, it enables the coproduction of high purity carbon monoxide and high purity hydrogen, and secondly, it enhances the yield of hydrogen produced in the plant (relative to the yield of hydrogen produced in a plant that does not use the improvement of the invention). The recovery of hydrogen produced in hydrogen PSA system D is enhanced because the concentration of carbon monoxide and carbon dioxide impurities in the feed stream to system D is decreased when high purity hydrogen from system F is introduced into the feed to system D via line 36.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

This hypothetical example is based on the system illustrated in the drawing, but comprising only units A, B, C and D, including recycle lines 22, 26 and 28. Units E and F and their associated piping are not part of the system in which the example is simulated. Unit D is assumed to comprise 4 serially-operated adsorbent beds, each bed containing layers of activated carbon and zeolites. Unit D is assumed to operate on a 16 minute cycle time and at a temperature of about 350° C. The cycle assumed to be carried out in the beds of unit D includes a two-stage bed equalization, and comprises the steps: adsorption, first bed equalization (depressurization), depressurization to purge, second bed equalization (depressurization), vent, purge, first bed equalization (repressurization), second bed equalization (repressurization) and product backfill.

Natural gas introduced through line 4 as feed and introduced through line 6 as fuel are assumed to be 98.8 and 4.5 lbm/hr (pound moles per hour), respectively. The flow rates in lbm/hr, pressures in bara (bar, absolute), temperatures in ° C and component concentrations in mol % at various points in the system are reported in Table I. Point (1) is in reformer product line 10, upstream of steam line 12; point (2) is in shift reactor outlet line 14; point (3) is in line 18 at the point of entry into vessel D; point (4) is in line 28; and point (5) is in hydrogen product line 20.

TABLE 1

| Point | (1) | (2) | (3) | (4) | (5) |
| --- | --- | --- | --- | --- | --- |
| Flow, lbm/hr | 566.20 | 566.20 | 399.96 | 160.4 | 239.6 |
| Press., bara | 18.62 | 16.55 | 16.21 | 1.38 | 15.86 |
| Temp., ° C. | 850 | 370 | 37 | 37 | 37 |
| $H_2$ | 50.69 | 54.47 | 76.80 | 39.84 | 99.99 |
| CO | 9.72 | 1.49 | 2.10 | 5.46 | — |
| $CO_2$ | 5.38 | 12.50 | 17.58 | 45.60 | — |
| $CH_4$ | 2.35 | 2.17 | 3.06 | 7.95 | — |
| $H_2O$ | 31.86 | 29.36 | 0.44 | 1.15 | — |

EXAMPLE 2

Hypothetical example 1 was repeated except that this example is based on the full system illustrated in the drawing, i. e. comprising all the units and associated piping illustrated in the drawing. The beds of PSA unit F are assumed to contain $Cu^{30}$-exchanged type Y zeolite. Unit F is assumed to operate at a half-cycle time of 420 sec and at a temperature of about 60° C. The cycle assumed to be carried out in the unit F comprises the steps: adsorption, cocurrent depressurization, equalization (depressurization), cocurrent purge, evacuation, equalization (repressurization) and feed pressurization.

The flow rates of natural gas feed and natural gas fuel are assumed to be the same as those in Example 1. Points (1) to (5) are the same as points (1) to (5) in Example 1. Point (6) is in line 34 at the outlet of drier unit E and point (7) is in line 36. The flow rate in line 40 is 13.42 lbm/hr; that in line 36 is 165.5 lbm/hr; and the flow rate and CO concentration of the product gas flowing in line 44 is 13.98 lbm/hr and 98%, respectively.

TABLE 2

| Point | (1) | (2) | (3) | (4) | (5) | (6) | (7) |
| --- | --- | --- | --- | --- | --- | --- | --- |
| Flow, lbm/hr | 566.20 | 283.1 | 365.48 | 138.85 | 232.6 | 192.9 | 165.5 |
| Press., bara | 18.62 | 16.55 | 15.86 | 1.38 | 15.52 | 16.90 | 16.55 |
| Temp., ° C. | 850 | 370 | 37 | 37 | 37 | 60 | 60 |
| $H_2$, % | 50.69 | 54.47 | 79.56 | 50.92 | 99.99 | 74.09 | 82.9 |
| CO, % | 9.72 | 1.49 | 3.34 | 7.67 | — | 14.21 | 4.83 |
| $CO_2$, % | 5.38 | 12.50 | 13.4 | 32.31 | — | 7.84 | 8.39 |
| $CH_4$, % | 2.35 | 2.17 | 3.4 | 8.07 | — | 3.43 | 3.82 |
| $H_2O$, % | 31.86 | 29.36 | 0.3 | 1.08 | — | 0.43 | 0 |

A comparison of examples 1 and 2 shows that using the full system illustrated in the drawing results in a little less product flow rate of high purity hydrogen, but also results in the production of 13.98 lbm/hr of 98% pure carbon monoxide. Furthermore, when the full system is operated (Example 2), the projected required sizes of water gas shift reactor B and hydrogen PSA unit D are only half and 64%, respectively, of the projected required sizes of water gas shift reactor B and hydrogen PSA unit D when only the hydrogen production plant is operated (Example 1).

Although the invention has been described with particular reference to specific equipment arrangements and to specific experiments, these features are merely exemplary of the invention and variations are contemplated. For example, dryers C and E may be purged with waste gas from one or more of lines 22 and 40, and the part or all of the purge effluent in lines 16 and 32 may be discharged from the system or returned to line 26. Furthermore, dryer C can be replaced by a layer of desiccant at the inlet end of hydrogen PSA system D. Similarly, dryer E can be replaced by a layer of desiccant positioned at the inlet end of the adsorption vessels of carbon monoxide PSA system F. The scope of the invention is limited only by the breadth of the appended claims.

What is claimed is:

1. In a process for producing hydrogen by reacting a gas mixture comprising hydrogen, carbon monoxide, carbon dioxide and 0 to about 10% by volume methane with steam, thereby causing at least part of said carbon monoxide to react with said steam to produce a hydrogen-enriched intermediate stream, and subjecting said hydrogen-enriched intermediate stream to a hydrogen pressure swing adsorption process comprising an adsorption step and an adsorbent regeneration step using a carbon dioxide-selective adsorbent, thereby producing a high purity hydrogen product stream and a first waste gas enriched in carbon dioxide or carbon dioxide and methane, the improvement comprising:

(a) passing part of the said gas mixture through at least one adsorption vessel at superatmospheric pressure, said at least one adsorption vessel containing an adsorbent which most strongly adsorbs carbon monoxide and least strongly adsorbs hydrogen from said dried gas mixture, thereby producing a nonadsorbed hydrogen-enriched gas and a carbon monoxide-enriched adsorbed phase;

(b) partially depressurizing said at least one adsorption vessel, thereby producing a second waste gas stream enriched in carbon dioxide or carbon dioxide and methane;

(c) further depressurizing said at least one adsorption vessel, thereby producing a carbon monoxide-enriched product gas; and (d) recycling said nonadsorbed hydrogen-enriched gas to said hydrogen-enriched intermediate stream.

2. The process of claim 1, further comprising drying said part of said gas mixture prior to step (a).

3. The process of claim 1, wherein said gas mixture is produced in a heated reaction zone.

4. The process of claim 3, further comprising recycling to said reaction zone at least part of said first waste gas, at least part of said second waste gas or at least part of both said first waste gas and said second waste gas.

5. The process of claim 3, further comprising using at least part of said first waste gas, at least part of said second waste gas or at least part of both said first waste gas and said second waste gas as fuel to heat said reaction zone.

6. The process of claim 1, wherein said hydrogen pressure swing adsorption step is carried out at a temperature in the range of about 0 to about 100° C.

7. The process of claim 6, wherein the adsorption step of said hydrogen pressure swing adsorption process is carried out at a pressure in the range of about 1 to about 40 bara.

8. The process of claim 1 or claim 7, wherein the adsorbent regeneration step of said hydrogen pressure swing adsorption process is carried out at a pressure in the range of about 0.05 to about 5 bara.

9. The process of claim 1, wherein said steps (a) (b) and (c) are carried out at a temperature in the range of about 0 to about 200° C.

10. The process of claim 9, wherein step (a) carried out at a pressure in the range of about 1 to about 40 bara.

11. The process of claim 10, wherein at least part of step (c) is carried out at a pressure in the range of about 0.05 to about 5 bara.

12. The process of claim 3, wherein said gas mixture is produced by hydrocarbon reforming, hydrocarbon partial oxidation, hydrocarbon gasification, coal gasification, ore reduction or mixtures of these.

13. The process of claim 12, wherein said gas mixture is produced by hydrocarbon steam reforming, hydrocarbon carbon dioxide reforming or mixtures of these.

14. The process of claim 9, wherein the adsorbent used in steps (a), (b) and (c) contains $Cu^+$ ion, $Ag^+$ ion, $Pd^{++}$ ion or mixtures of these.

15. The process of claim 14, wherein steps (a), (b) and (c) are carried out at a temperature in the range of about 60 to about 150° C.

16. The process of claim 15, wherein step (a) is carried out at a pressure in the range of about 1 to about 20 bara.

17. The process of claim 16, wherein step (c) is at least partly carried out at a pressure in the range of about 0.05 to about 1.5 bara.

18. The process of claim 1, further comprising, prior to step (a), subjecting said part of said gas mixture to a pressure swing adsorption process using a carbon dioxide-selective adsorbent.

19. The process of claim 1, further comprising subjecting at least part of said second waste gas to a pressure swing adsorption process using a carbon dioxide-selective adsorbent, thereby producing a carbon dioxide-enriched gas and a carbon dioxide-depleted gas.

20. The process of claim 19, wherein said gas mixture is produced in a heated reaction zone.

21. The process of claim 20, further comprising recycling at least part of said carbon dioxide-depleted gas to said heated reaction zone.

22. The process of claim 20, further comprising using at least part of said carbon dioxide-depleted gas as fuel to heat said reaction zone.

23. The process of claim 1, further comprising, prior to step (c), purging the adsorbent in said at least one adsorption vessel with carbon monoxide-enriched product gas produced during step (c).

24. The process of claim 1, further comprising, subsequent to step (b), purging the adsorbent in said at least one adsorption vessel with carbon monoxide-enriched product gas produced during step (c).

25. The process of claim 23 or claim 24, further comprising recycling part of said second waste gas stream to said at least one adsorption vessel during step (a).

* * * * *